US012684495B2

(12) United States Patent
Menon et al.

(10) Patent No.: US 12,684,495 B2
(45) Date of Patent: Jul. 14, 2026

(54) BATTERY OPTIMIZATION FOR NON-TERRESTRIAL NETWORK-CONNECTED USER ENDPOINT DEVICES

(71) Applicants: AT&T Intellectual Property I, L.P., Atlanta, GA (US); AT&T Mobility II LLC, Atlanta, GA (US)

(72) Inventors: Sreejith Menon, Herndon, VA (US); Suja John, Herndon, VA (US)

(73) Assignees: AT&T Intellectial Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 391 days.

(21) Appl. No.: 18/476,290

(22) Filed: Sep. 27, 2023

(65) Prior Publication Data

US 2025/0106783 A1     Mar. 27, 2025

(51) Int. Cl.
*H04W 52/28* (2009.01)
*H04W 52/40* (2009.01)

(52) U.S. Cl.
CPC ......... *H04W 52/285* (2013.01); *H04W 52/40* (2013.01)

(58) Field of Classification Search
CPC .................................................... H04W 52/40
See application file for complete search history.

(56) References Cited

U.S. PATENT DOCUMENTS

| | | | | |
|---|---|---|---|---|
| 6,636,721 | B2 * | 10/2003 | Threadgill | ......... H04B 7/18539 455/12.1 |
| 6,760,566 | B1 * | 7/2004 | Wright | ............... H04B 7/18543 370/318 |
| 6,850,497 | B1 * | 2/2005 | Sigler | .................. H04B 7/1853 455/526 |
| 11,671,933 | B2 * | 6/2023 | Liu | ..................... H04W 74/004 370/328 |
| 2018/0160373 | A1 * | 6/2018 | Ravishankar | ....... H04W 52/242 |
| 2018/0227166 | A1 * | 8/2018 | Palenius | ............. H04L 41/0233 |
| 2020/0178135 | A1 * | 6/2020 | Yun | ..................... H04W 36/0061 |
| 2020/0266903 | A1 * | 8/2020 | De Rosa | ........... H04B 7/18506 |
| 2021/0051595 | A1 * | 2/2021 | Rico Alvarino | .... H04W 52/283 |
| 2021/0288715 | A1 * | 9/2021 | Gao | ..................... H04W 72/04 |
| 2021/0399797 | A1 * | 12/2021 | Khan | .................. H04W 36/085 |
| 2022/0174610 | A1 * | 6/2022 | Qiao | .................. H04W 52/283 |
| 2022/0264502 | A1 * | 8/2022 | Liu | ..................... H04W 16/26 |
| 2022/0322263 | A1 * | 10/2022 | Sengupta | ............ H04W 56/004 |
| 2022/0330168 | A1 * | 10/2022 | Alasti | ................... H04W 52/46 |
| 2022/0394671 | A1 * | 12/2022 | Zhang | ................. H04B 7/0617 |
| 2023/0023056 | A1 * | 1/2023 | Ma | ............................ G01S 5/06 |
| 2023/0047987 | A1 * | 2/2023 | Tseng | ................... H04W 36/08 |
| 2023/0051054 | A1 * | 2/2023 | Ma | ........................ G01S 19/256 |

(Continued)

*Primary Examiner* — Wutchung Chu
*Assistant Examiner* — Berhanu D Belete

(57) ABSTRACT

A method includes detecting that a first satellite of a non-terrestrial network is moving out of a field of view of a user endpoint device that is currently connected to the non-terrestrial network, estimating a time at which a second satellite of the non-terrestrial network is expected to enter the field of view of the user endpoint device, selecting, in response to the time at which the second satellite of the non-terrestrial network is expected to enter the field of view of the user endpoint device, an uplink power for the user endpoint device, and sending, to the user endpoint device, an instruction to transmit at the uplink power that is selected.

20 Claims, 4 Drawing Sheets

100

(56)     References Cited

U.S. PATENT DOCUMENTS

| | | | | |
|---|---|---|---|---|
| 2023/0269780 | A1* | 8/2023 | Ravishankar | H04B 7/185 |
| | | | | 370/329 |
| 2023/0370154 | A1* | 11/2023 | Ciochina | H04B 7/18539 |
| 2023/0396330 | A1* | 12/2023 | Åström | H04B 7/18541 |
| 2023/0413131 | A1* | 12/2023 | Shrestha | H04W 72/23 |
| 2024/0031939 | A1* | 1/2024 | Park | H04W 52/08 |
| 2024/0107472 | A1* | 3/2024 | Shrestha | H04W 56/0015 |
| 2024/0171266 | A1* | 5/2024 | Beale | H04B 7/18519 |
| 2024/0267808 | A1* | 8/2024 | Ji | H04B 7/18541 |
| 2024/0381196 | A1* | 11/2024 | Cheng | H04W 36/00725 |
| 2024/0422763 | A1* | 12/2024 | Lei | H04W 72/12 |
| 2025/0048355 | A1* | 2/2025 | Xu | H04L 5/0051 |
| 2025/0080213 | A1* | 3/2025 | Ravishankar | H04B 7/1851 |
| 2025/0081283 | A1* | 3/2025 | Liu | H04W 72/1215 |
| 2025/0212081 | A1* | 6/2025 | Luo | H04B 7/18541 |
| 2025/0286613 | A1* | 9/2025 | Yavuz | H04B 7/18541 |
| 2025/0300717 | A1* | 9/2025 | Khamse-Ashari | H04B 7/2041 |
| 2025/0350354 | A1* | 11/2025 | Rune | H04W 16/22 |

* cited by examiner

200

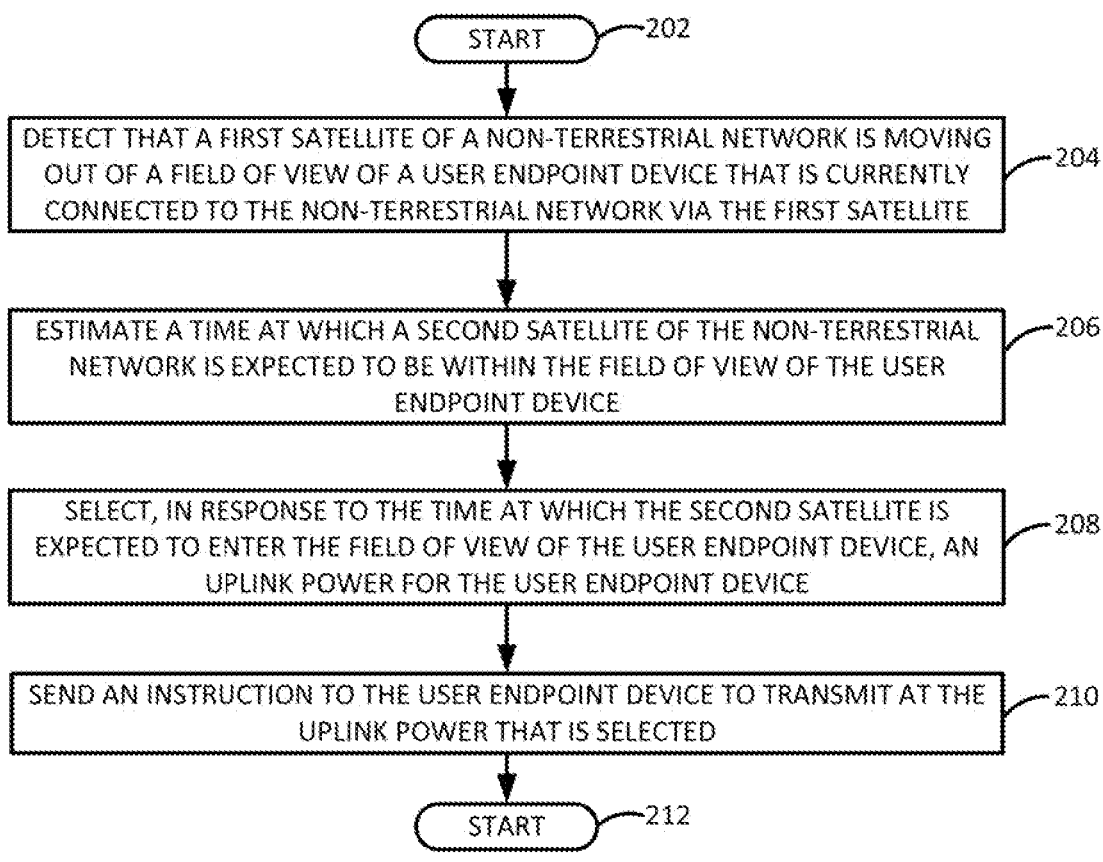

START ─202

DETECT THAT A FIRST SATELLITE OF A NON-TERRESTRIAL NETWORK IS MOVING OUT OF A FIELD OF VIEW OF A USER ENDPOINT DEVICE THAT IS CURRENTLY CONNECTED TO THE NON-TERRESTRIAL NETWORK VIA THE FIRST SATELLITE ─204

ESTIMATE A TIME AT WHICH A SECOND SATELLITE OF THE NON-TERRESTRIAL NETWORK IS EXPECTED TO BE WITHIN THE FIELD OF VIEW OF THE USER ENDPOINT DEVICE ─206

SELECT, IN RESPONSE TO THE TIME AT WHICH THE SECOND SATELLITE IS EXPECTED TO ENTER THE FIELD OF VIEW OF THE USER ENDPOINT DEVICE, AN UPLINK POWER FOR THE USER ENDPOINT DEVICE ─208

SEND AN INSTRUCTION TO THE USER ENDPOINT DEVICE TO TRANSMIT AT THE UPLINK POWER THAT IS SELECTED ─210

START ─212

BATTERY OPTIMIZATION FOR NON-TERRESTRIAL NETWORK-CONNECTED USER ENDPOINT DEVICES

The present disclosure relates generally to mobile networks and relates more particularly to devices, non-transitory computer-readable media, and methods for optimizing the power consumption of user endpoint devices connected to non-terrestrial networks.

BACKGROUND

In the field of mobile networking, non-terrestrial networks (NTNs) are networks for which at least a portion of the physical infrastructure is not anchored to the Earth's surface. NTNs stand in contrast to terrestrial networks (TNs), which are networks for which a majority, if not all, of the physical infrastructure is anchored to the Earth's surface. For instance, NTNs include satellite networks and networks that utilize unmanned aerial vehicles or high-altitude platform systems to provide broadband links, while TNs include Fourth Generation long term evolution (4G LTE) and Wi-Fi networks. NTNs are considered to be one of the major pillars of Fifth Generation (5G), Sixth Generation (6G), and next-generation mobile networks due to their ability to extend mobile network coverage to locations that are currently underserved by TNs.

SUMMARY

In one example, the present disclosure describes a device, computer-readable medium, and method for optimizing the power consumption of user endpoints connected to non-terrestrial networks. For instance, in one example, a method includes detecting that a first satellite of a non-terrestrial network is moving out of a field of view of a user endpoint device that is currently connected to the non-terrestrial network, estimating a time at which a second satellite of the non-terrestrial network is expected to enter the field of view of the user endpoint device, selecting, in response to the time at which the second satellite of the non-terrestrial network is expected to enter the field of view of the user endpoint device, an uplink power for the user endpoint device, and sending, to the user endpoint device, an instruction to transmit at the uplink power that is selected.

In another example, a non-transitory computer-readable medium stores instructions which, when executed by a processor, cause the processor to perform operations. The operations include detecting that a first satellite of a non-terrestrial network is moving out of a field of view of a user endpoint device that is currently connected to the non-terrestrial network, estimating a time at which a second satellite of the non-terrestrial network is expected to enter the field of view of the user endpoint device, selecting, in response to the time at which the second satellite of the non-terrestrial network is expected to enter the field of view of the user endpoint device, an uplink power for the user endpoint device, and sending, to the user endpoint device, an instruction to transmit at the uplink power that is selected.

In another example, a device includes a processor and a computer-readable medium storing instructions which, when executed by the processor, cause the processor to perform operations. The operations include detecting that a first satellite of a non-terrestrial network is moving out of a field of view of a user endpoint device that is currently connected to the non-terrestrial network, estimating a time at which a second satellite of the non-terrestrial network is expected to enter the field of view of the user endpoint device, selecting, in response to the time at which the second satellite of the non-terrestrial network is expected to enter the field of view of the user endpoint device, an uplink power for the user endpoint device, and sending, to the user endpoint device, an instruction to transmit at the uplink power that is selected.

BRIEF DESCRIPTION OF THE DRAWINGS

The teachings of the present disclosure can be readily understood by considering the following detailed description in conjunction with the accompanying drawings, in which:

FIG. 2 illustrates a flowchart of an example method for optimizing the power consumption of user endpoints connected to non-terrestrial networks, in accordance with the present disclosure;

To facilitate understanding, identical reference numerals have been used, where possible, to designate identical elements that are common to the figures.

DETAILED DESCRIPTION

Figure 1:
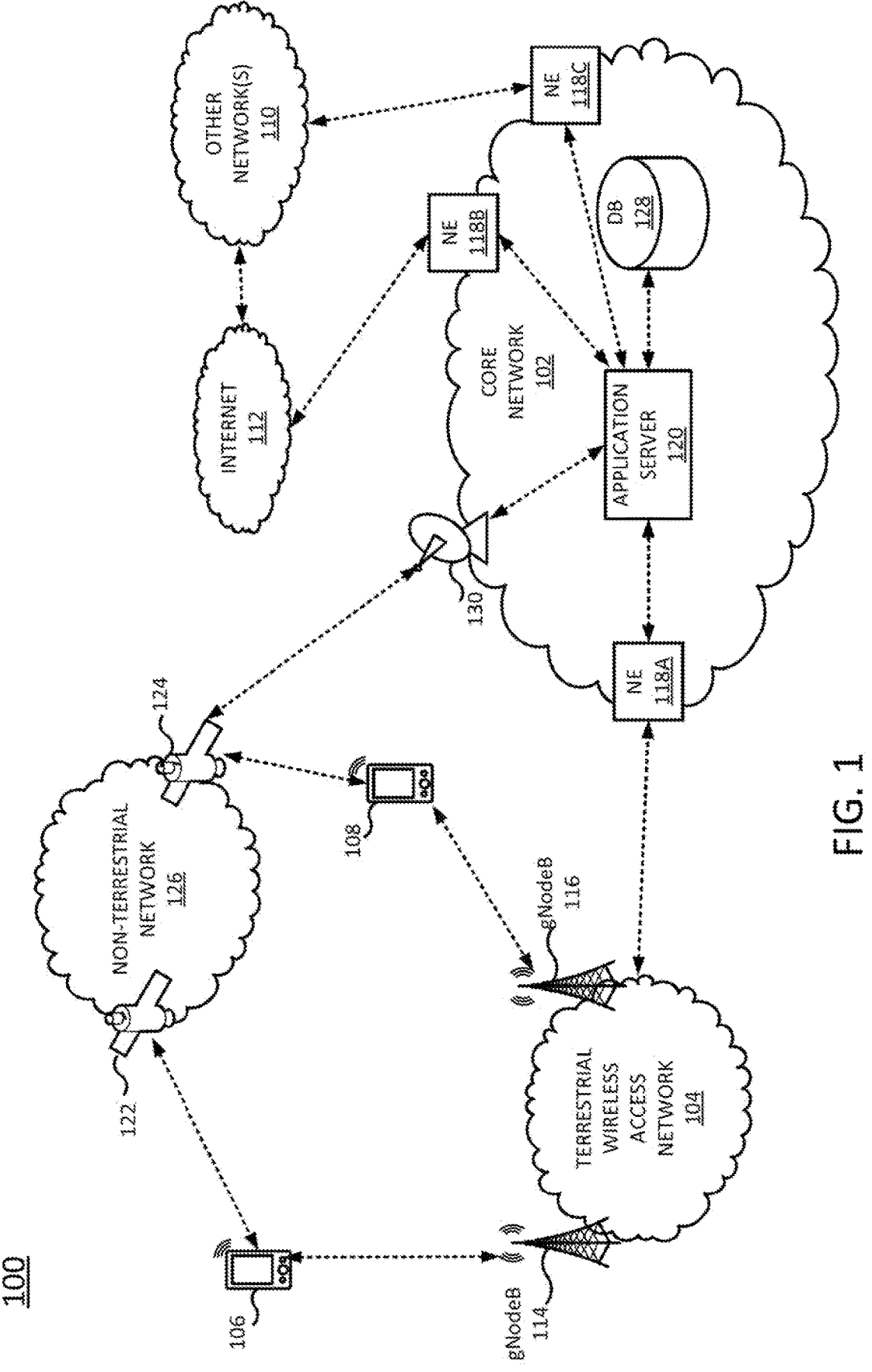
FIG. 1 illustrates an example network related to the present disclosure.

In one example, the present disclosure describes a device, computer-readable medium, and method for optimizing the power consumption of user endpoints connected to non-terrestrial networks. As discussed above, non-terrestrial networks (NTNs) are networks for which at least a portion of the physical infrastructure is not anchored to the Earth's surface. NTNs stand in contrast to terrestrial networks (TNs), which are networks for which a majority, if not all, of the physical infrastructure is anchored to the Earth's surface. For instance, NTNs include satellite networks and networks that utilize unmanned aerial vehicles or high-altitude platform systems to provide broadband links, while TNs include Fourth Generation long term evolution (4G LTE) and Wi-Fi networks. NTNs are considered to be one of the major pillars of Fifth Generation (5G), Sixth Generation (6G), and next-generation mobile networks due to their ability to extend mobile network coverage to locations that are currently underserved by TNs.

One of the biggest obstacles to effectively leveraging NTNs in mobile networking is energy consumption. Although conventional mobile devices (e.g., mobile phones, tablet computers, smart watches, smart glasses, drones, autonomous vehicles, and the like) are capable of communication with low Earth orbit (LEO) satellites, communications with NTNs tend to deplete the batteries of the mobile devices much more quickly than communications with TNs.

Moreover, unlike the physical infrastructure of TNs, much of the physical infrastructure of NTNs (e.g., LEO satellites) can move. Thus, the coverage area for an NTN may vary over time with the movement of its physical infrastructure; a mobile device that was once within the coverage area of the NTN may later and unknowingly find itself outside the coverage area even if the physical location of the mobile device has remained constant. Thus, if the mobile device continues to transmit at the same uplink power to try to locate the NTN after the satellite has moved out of range, this will further and needlessly deplete the mobile device's limited battery.

Examples of the present disclosure optimize the power consumption of user endpoints connected to non-terrestrial networks by facilitating handovers between satellites when a satellite to which a user endpoint is connected determined that it is moving out of the user endpoint's field of view. In particular, when a satellite of a non-terrestrial network determines that it is moving out of the field of view of a user endpoint that is connected to the non-terrestrial network via the satellite, the satellite will determine whether there is an alternate satellite to which the user endpoint can connect to maintain the connection to the non-terrestrial network. If an alternate satellite is identified, the satellite may instruct the user endpoint to continue to transmit at a current uplink power so that the user endpoint may locate and connect to the alternate satellite. If, however, an alternate satellite is not identified, the satellite may instruct the user endpoint to transmit at an uplink power that is lower than the current uplink power, so that the user endpoint does not waste uplink power scanning for a satellite that is not there.

In other examples, the user endpoint may simply detect when the connection to the satellite is lost, and may autonomously take steps to reduce the uplink power at which the user endpoint is currently transmitting. These and other aspects of the present disclosure are discussed in greater detail in connection with FIGS. 1-4, below.

To better understand the present disclosure, FIG. 1 illustrates an example network 100, related to the present disclosure. As shown in FIG. 1, the network 100 connects mobile devices 106 and 108, as well as potentially other devices, with one another and with various other devices via a core network 102, a wireless access network 104 (e.g., a cellular network), other networks 110 and/or the Internet 112.

In one example, wireless access network 104 may comprise a terrestrial network, such as a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 104 may comprise an access network in accordance with any "second generation" (2G), "third generation" (3G), "fourth generation" (4G), Long Term Evolution (LTE), "fifth generation" (5G), next-generation radio access network (NG-RAN), or any other yet to be developed future wireless/cellular network technology including beyond 5G and further generations. While the present disclosure is not limited to any particular type of wireless access network, in the illustrative example, wireless access network 104 is shown as a UMTS terrestrial radio access network (UTRAN) subsystem. Thus, elements 114 and 116 may each comprise a next generation Node B (gNodeB).

In one example, each of the mobile devices 106 and 108 may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a wearable smart device (e.g., a smart watch or fitness tracker, a pair of smart glasses or goggles, etc.), a gaming console, a drone, an autonomous vehicle (e.g., automobile, watercraft, or aircraft), and the like. In one example, any one or more of mobile devices 106 and 108 may have both cellular and non-cellular access capabilities and may further have wired communication and networking capabilities.

As illustrated in FIG. 1, network 100 includes a core network 102. In one example, core network 102 may combine core network components of a cellular network with components of a triple play service network; where triple play services include telephone services, Internet services and television services to subscribers. For example, core network 102 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may also further comprise a broadcast television network, e.g., a traditional cable provider network or an Internet Protocol Television (IPTV) network, as well as an Internet Service Provider (ISP) network. The network elements 118A-118C may serve as gateway servers or edge routers to interconnect the core network 102 with other networks 110, Internet 112, wireless access network 104, other access networks, and so forth. The core network 102 may also comprise an application server (AS) 120 and a database (DB) 128 that are configured to monitor and store the locations and movements of the mobile devices 106 and 108 and satellites 122 and 124 of a non-terrestrial network 126 and to send instructions to mobile devices 106 and 108 to configure their uplink power transmissions to optimize power consumption, as discussed in further detail below. For ease of illustration, various additional elements of core network 102 are omitted from FIG. 1. For instance, core network 102 may also include other network elements that are not illustrated, such as television (TV) servers, content servers, application servers, and the like.

In addition, the network 100 may include the non-terrestrial network 126 that functions in a manner similar to the terrestrial wireless access network 104. For instance, the non-terrestrial network 126 may comprise an access network that provides broadband links via satellite, unmanned aerial vehicles, high-altitude platform systems, or any other yet to be developed future wireless/non-terrestrial network technology. While the present disclosure is not limited to any particular type of non-terrestrial network, in the illustrative example, non-terrestrial network 126 is shown as a satellite network. Thus, elements 122 and 124 may each comprise a satellite, such as an LEO satellite. In one example, the non-terrestrial network 126 may be controlled and/or operated by a same network service provider as the terrestrial wireless access network 104. In another example, the non-terrestrial network 126 may be controlled and/or operated by a different entity than the network service provider who operates the terrestrial wireless access network 104.

In one example, the AS 120 may be configured to monitor the locations and movements (e.g., speed and trajectory of motion) of the mobile devices 106 and 108 and to send instructions to the mobile devices 106 and 108 that cause the mobile devices to configure their uplink power transmissions to optimize power consumption.

As an example, mobile device 106 may be connected to the non-terrestrial network 126 via the satellite 122, which is currently within the field of view of (and, thus, reachable by the transmissions of) the mobile device 106. However, as discussed above, satellites such as LEO satellites do not remain fixed in a single physical location, but instead may orbit near the Earth's surface. As such, as the satellite 122 orbits, the satellite may leave the field of view of the mobile device 106, causing the mobile device 106 to lose its connection to the non-terrestrial network 126.

However, in one example, the AS 120 (or the satellite 122 itself) may detect when the satellite 122 is expected to leave the field of view of the mobile device 106 and may, in response, identify an alternate satellite, such as the satellite 124 that is expected to move into the field of view of the mobile device 106. If an alternate satellite is identified, then the AS 120 (or the satellite 122 itself) may instruct the mobile device 106 to continue to transmit at its current uplink power (or at least at an uplink power that is sufficient to reach the alternate satellite). This will allow the mobile device 106 to maintain the connection to the non-terrestrial network when the first satellite 122 leaves the field of view of the mobile device 106 by allowing the mobile device 106 to detect and connect to the alternate satellite 124.

If, however, the AS 120 (or the satellite 122 itself) cannot identify an alternate satellite that is expected to enter the field of view of the mobile device 106, then the AS 120 (or the satellite 122 itself) may instruct the mobile device 106 to reduce the uplink power of its transmissions (e.g., in some instances the instruction may further include a time duration for staying at the lower power level given a projected next arrival of another satellite if the mobile device is projected to remain in the current location). In one example, the AS 120 or satellite 122 may instruct the mobile device to reduce the uplink power to a level that is still sufficient to reach one of the base stations 114 or 116 of the terrestrial wireless access network 104. This will allow the mobile device 106 to maintain connectivity to the core network 102 while minimizing wastage of uplink power (e.g., by preventing the mobile device from transmitting at the higher uplink power needed to reach the satellites 122 and 124 when no satellites are expected to be within the field of view of the mobile device 106).

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 102 is not limited to an IMS network. Wireless access network 104 is not limited to a UMTS/UTRAN configuration. Non-terrestrial network 126 is not limited to a satellite network. Similarly, the present disclosure is not limited to an IP/MPLS network for VoIP telephony services, or any particular type of broadcast television network for providing television services, and so forth.

To further aid in understanding the present disclosure, FIG. 2 illustrates a flowchart of an example method 200 for optimizing the power consumption of user endpoints connected to non-terrestrial networks, in accordance with the present disclosure. In one example, the method 200 may be performed by a satellite of a non-terrestrial network, such as satellite 122 or 124 of FIG. 1, or by an application server, such as the AS 120 illustrated in FIG. 1. However, in other examples, the method 200 may be performed by another device, such as the processor 402 of the system 400 illustrated in FIG. 4. For the sake of example, the method 200 is described as being performed by a processing system.

The method 200 begins in step 202. In step 204, the processing system may detect that a first satellite of a non-terrestrial network is moving out of a field of view of a user endpoint device that is currently connected to the non-terrestrial network.

In one example, the processing system may be part of the first satellite. The first satellite may, in turn, comprise a portion of the physical infrastructure of the non-terrestrial network, where the non-terrestrial network may comprise a plurality of satellites including the first satellite. In one example, the first satellite is an LEO satellite.

As discussed above, LEO satellites do not remain fixed in a single physical location. Thus, the physical location of an LEO satellite may change over time as the LEO satellite orbits near the Earth's surface. Thus, although the first satellite may be within the field of view of the user endpoint device at one time, this does not necessarily mean that the first satellite will remain within the field of view of the first satellite. If the user endpoint device loses its connection to the first satellite, the user endpoint device may not be able to connect to the non-terrestrial network.

In one example, the user endpoint device may comprise any subscriber/customer endpoint device configured for wireless communication, such as a laptop computer, a Wi-Fi device, a Personal Digital Assistant (PDA), a mobile phone, a smartphone, an email device, a computing tablet, a messaging device, a wearable smart device (e.g., a smart watch or fitness tracker, a pair of smart glasses or goggles, etc.), a gaming console, a drone, an autonomous vehicle (e.g., automobile, watercraft, or aircraft), and the like.

In one example, the processing system may estimate or predict a time at which the first satellite is expected to leave the field of view of the user endpoint device. The time at which the first satellite is expected to leave the field of view of the user endpoint device may be estimated based on knowledge of at least one of: the current location of the user endpoint device, the current trajectory of the user endpoint device, the current speed of motion of the user endpoint device, the current location of the first satellite, the current trajectory of the first satellite, or the current speed of motion of the first satellite. In one example, the processing system may utilize a machine learning algorithm (such as a support vector machine, a neural network, a Bayes network, a decision tree, or the like) that takes any one or more of the aforementioned parameters as input and generates as an output the time at which the first satellite is expected to leave the field of view of the user endpoint device.

In step 206, the processing system may estimate a time at which a second satellite of the non-terrestrial network is expected to enter the field of view of the user endpoint device.

As discussed above, the physical location of an LEO satellite may change over time as the LEO satellite orbits near the Earth's surface. Thus, although the first satellite may be moving out of the field of view of the user endpoint device, another satellite (e.g., the second satellite) may be moving into the field of view of the user endpoint device. In one example, the second satellite is an LEO satellite that is in the same LEO orbit as the first satellite.

In one example, the time at which the second satellite is expected to enter the field of view of the user endpoint device may be estimated or predicted based on knowledge of at least one of: the current location of the user endpoint device, the current trajectory of the user endpoint device, the current speed of motion of the user endpoint device, the current location of the second satellite, the current trajectory of the second satellite, or the current speed of motion of the second satellite. In one example, the processing system may utilize a machine learning algorithm (such as a support vector machine, a neural network, a Bayes network, a decision tree, or the like) that takes any one or more of the aforementioned parameters as input and generates as an output the time at which the second satellite (or a third satellite, a fourth satellite, etc.) is expected to enter the field of view of the user endpoint device.

The second satellite may be expected to enter the field of view of the user endpoint device before the time at which the first satellite is expected to leave the field of view of the user endpoint device, or the second satellite may be expected to enter the field of view of the user endpoint device after the time at which the first satellite is expected to leave the field of view of the user endpoint device.

In step 208, the processing system may select, in response to the time at which the second satellite is expected to enter the field of view of the user endpoint device, an uplink power for the user endpoint device.

In one example, the selection of the uplink power may be based on the time at which the second satellite is expected to enter the field of view of the user endpoint device. For instance, if the second satellite is expected to enter the field of view of the user endpoint device within some predefined threshold period of time of the time at which the first satellite is expected to leave the field of view of the user endpoint device (where the predefined threshold period of time may be, for example, x minutes), then the selected uplink power may be the same as the current uplink power at which the user endpoint device is transmitting. This will facilitate a handover of the connection to the user endpoint device from the first satellite to the second satellite.

If, however, the second satellite is not expected to enter the field of view of the user endpoint device within the predefined threshold period of time of the time at which the first satellite is expected to leave the field of view of the user endpoint device (e.g., the second satellite is expected to enter the field of view of the user endpoint device x minutes or more after the first satellite leaves the field of view of the user endpoint device), then the selected uplink power may be lower than the current uplink power at which the user endpoint device is transmitting (e.g., for a duration of time until the second satellite enters the field of view of the user endpoint device). The lower uplink power may be an uplink power that is sufficient to connect to a non-terrestrial network whose coverage area encompasses the current physical location of the user endpoint device (e.g., to reach a base station of the non-terrestrial network). This ensures that the user endpoint device does not waste uplink power scanning for satellites when the user endpoint device is no longer within the coverage area of the non-terrestrial network.

In one example, the predefined threshold period of time may be configurable. For instance, the predefined threshold period of time may be shortened as needed to minimize wastage of uplink power and ensure that the user endpoint device does not spend too much time scanning for satellites that are not within its field of view (or not expected to be within its field of view within a predefined threshold period of time). Conversely, the predefined threshold period of time may be lengthened as needed to maximize the opportunity for the user endpoint device to maintain or restore its connection to the non-terrestrial network. Thus the length of the predefined threshold period of time may be configured to balance the competing interests of minimizing wasted uplink power and maintaining the connection to the non-terrestrial network.

In step 210, the processing system may send, to the user endpoint device, an instruction to transmit at the uplink power that is selected.

For instance, as discussed above, the instruction may instruct the user endpoint device to continue to transmit at the uplink power at which it is currently transmitting, in order to facilitate a handover to the second satellite. Alternatively, the instruction may instruct the user endpoint device to begin transmitting at an uplink power that is lower than the uplink power at which it is currently transmitting, so that the user endpoint device does not waste uplink power when the user endpoint device is no longer within the coverage area of the non-terrestrial network.

In one example, the instruction may further instruct the user endpoint device to reduce a frequency with which the user endpoint device performs periodic background scans for satellites within transmission range of the user endpoint device. In one example, the reduced frequency may be determined by the processing system based on the time at which the second satellite is expected to be within the field of view of the user endpoint device. For instance, if the user endpoint device is currently performing scans every thirty seconds, and the second satellite is expected to be within the field of view of the user endpoint device in three minutes, then the instruction may instruct the user endpoint device to reduce the frequency of the scans to every two minutes. The method 200 may end in step 212.

Figure 3:
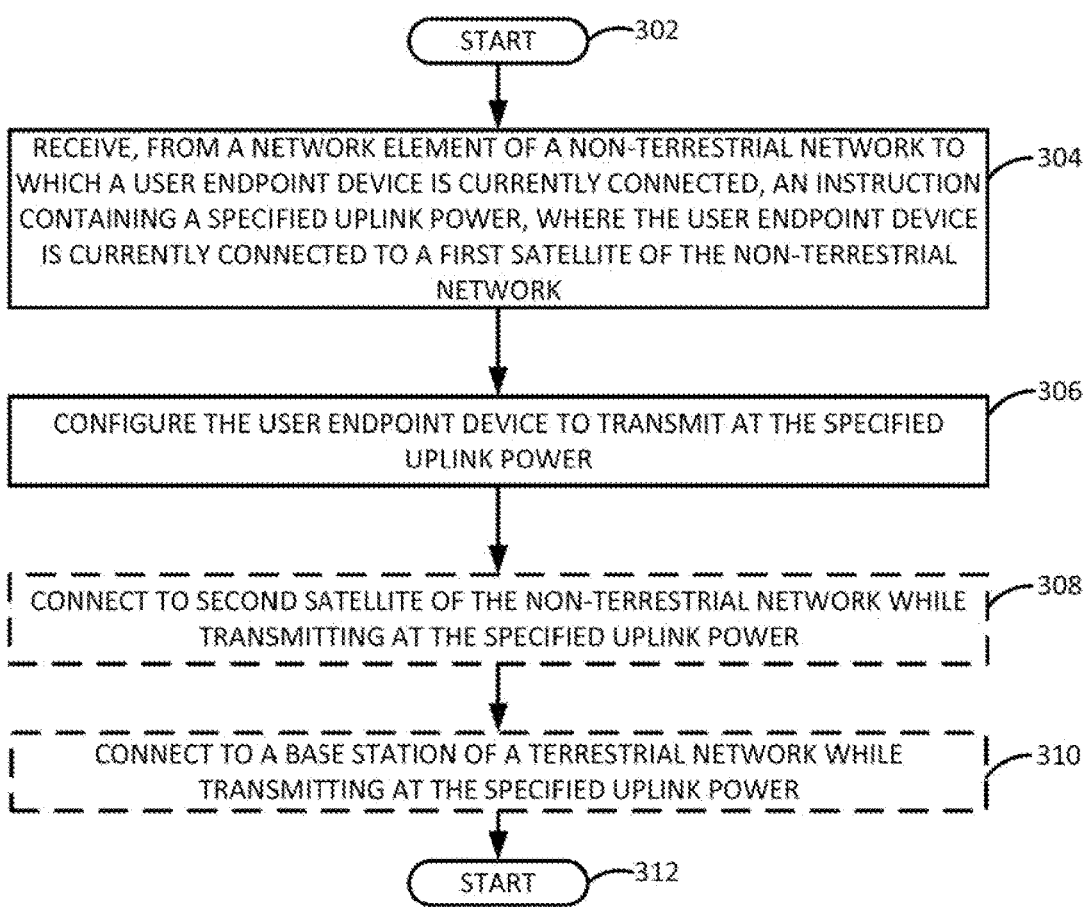
FIG. 3 illustrates a flowchart of an example method for optimizing the power consumption of user endpoints connected to non-terrestrial networks, in accordance with the present disclosure.

FIG. 3 illustrates a flowchart of an example method 300 for optimizing the power consumption of user endpoints connected to non-terrestrial networks, in accordance with the present disclosure. In one example, the method 300 may be performed by a mobile device, such as the mobile device 106 or 108 illustrated in FIG. 1. However, in other examples, the method 300 may be performed by another device, such as the processor 402 of the system 400 illustrated in FIG. 4. For the sake of example, the method 300 is described as being performed by a processing system.

The method 300 begins in step 302. In step 304, the processing system may receive, from a network element of a non-terrestrial network to which a user endpoint device is currently connected, an instruction containing a specified uplink power, where the user endpoint device is currently connected to a first satellite of the non-terrestrial network.

In one example, the processing system may be part of the user endpoint device. In one example, the user endpoint device may comprise any subscriber/customer endpoint device configured for wireless communication, such as a laptop computer, a Wi-Fi device, a Personal Digital Assistant (PDA), a mobile phone, a smartphone, an email device, a computing tablet, a messaging device, a wearable smart device (e.g., a smart watch or fitness tracker, a pair of smart glasses or goggles, etc.), a gaming console, a drone, an autonomous vehicle (e.g., automobile, watercraft, or aircraft), and the like.

In one example, the first satellite may comprise a portion of the physical infrastructure of the non-terrestrial network, where the non-terrestrial network may comprise a plurality of satellites including the first satellite. In one example, the first satellite is an LEO satellite.

As discussed above, LEO satellites do not remain fixed in a single physical location. Thus, the physical location of an LEO satellite may change over time as the LEO satellite orbits near the Earth's surface. Thus, although the first satellite may be within the field of view of the user endpoint device at one time, this does not necessarily mean that the first satellite will remain within the field of view of the first satellite. If the user endpoint device loses its connection to the first satellite, the user endpoint device may not be able to connect to the non-terrestrial network.

In one example, the instruction may instruct the user endpoint device to continue to transmit at an uplink power at which the user endpoint device is currently transmitting. For instance, when the first satellite is close to leaving the field of view of the user endpoint device, continuing to transmit at the same uplink power (i.e., an uplink power necessary to reach an LEO satellite) may facilitate a handover of the user endpoint device's connection from the first satellite to a second satellite that is (or is expected to be, within some predefined threshold period of time) within the field of view of the user endpoint device.

Alternatively, the instruction may instruct the user endpoint device to begin transmitting at an uplink power that is lower than the uplink power at which it is currently transmitting. For instance, when the first satellite is close to leaving the field of view of the user endpoint device and no alternate satellite is expected to enter the field of view of the user endpoint device within a predefined threshold period of time of the first satellite leaving the field of view of the user endpoint device, reducing the uplink power (e.g., to an uplink power necessary to reach a base station of a terrestrial network) may prevent the user endpoint device from wasting uplink power when the user endpoint device is no longer within the coverage area of the non-terrestrial network.

As discussed above, the specified uplink power may be selected by the network element based on whether a second satellite is expected to enter the field of view of the user endpoint device within a predefined threshold period of time of a time at which the first satellite is expected to leave the field of view of the user endpoint device.

In one example, the network element may estimate the time at which the first satellite is expected to leave the field of view of the user endpoint device based on knowledge of at least one of: the current location of the user endpoint device, the current trajectory of the user endpoint device, the current speed of motion of the user endpoint device, the current location of the first satellite, the current trajectory of the first satellite, and/or the current speed of motion of the first satellite. In one example, the network element may utilize a machine learning algorithm (such as a support vector machine, a neural network, a Bayes network, a decision tree, or the like) that takes any one or more of the aforementioned parameters as input and generates as an output the time at which the first satellite is expected to leave the field of view of the user endpoint device.

In one example, the network element may determine whether the second satellite is expected to enter the field of view of the user endpoint device within the predefined threshold period of time of the time at which the first satellite leaving the field of view of the user endpoint device based on one or more of: the current location of the user endpoint device, the current trajectory of the user endpoint device, the current speed of motion of the user endpoint device, the current location of the second satellite, the current trajectory of the second satellite, and/or the current speed of motion of the second satellite.

In one example, the instruction may further instruct the user endpoint device to reduce a frequency with which the user endpoint device performs periodic background scans for satellites. In one example, the reduced frequency may be determined by the network element based on the time at which the second satellite is expected to be within the field of view of the user endpoint device. For instance, if the user endpoint device is currently performing scans every thirty seconds, and the second satellite is expected to be within the field of view of the user endpoint device in three minutes, then the instruction may instruct the user endpoint device to reduce the frequency of the scans to every two minutes and the like.

In step 306, the processing system may configure the user endpoint device to transmit at the specified uplink power.

For instance, if the specified uplink power is the same as an uplink power at which the user endpoint device is currently transmitting, then the processing system may not change the uplink power at which the user endpoint device is currently transmitting. However, if the specified uplink power is lower than an uplink power at which the user endpoint device is currently transmitting, then the processing system may reduce the uplink power at which the user endpoint device is currently transmitting. For instance, the specified uplink power may be an uplink power that is too low to reach an LEO satellite or a non-terrestrial network, but is high enough to reach a base station of a terrestrial network.

In optional step 308 (illustrated in phantom), the processing system may connect to a second satellite of the non-terrestrial network while transmitting at the specified uplink power.

Step 308 may be performed when the processing system does not change the uplink power at which the user endpoint device is currently transmitting in step 306 (or does not reduce the uplink power to lower than an uplink power needed to reach an LEO satellite). This may facilitate a handover of the connection to the user endpoint device from the first satellite to the second satellite.

In optional step 310 (illustrated in phantom), the processing system may connect to a base station of a terrestrial network while transmitting at the specified uplink power.

Step 310 may be performed when the processing system reduces the uplink power at which the user endpoint device is currently transmitting (e.g., to an uplink power that is too low to reach an LEO satellite or a non-terrestrial network, but is high enough to reach a base station of a terrestrial network). This may allow the user endpoint device to connect to a terrestrial network while ensuring that the user endpoint device does not waste uplink power scanning for satellites when the user endpoint device is no longer within the coverage area of the non-terrestrial network.

The method 300 may end in step 312.

Although not expressly specified above, one or more steps of the method 200 or method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

Figure 4:
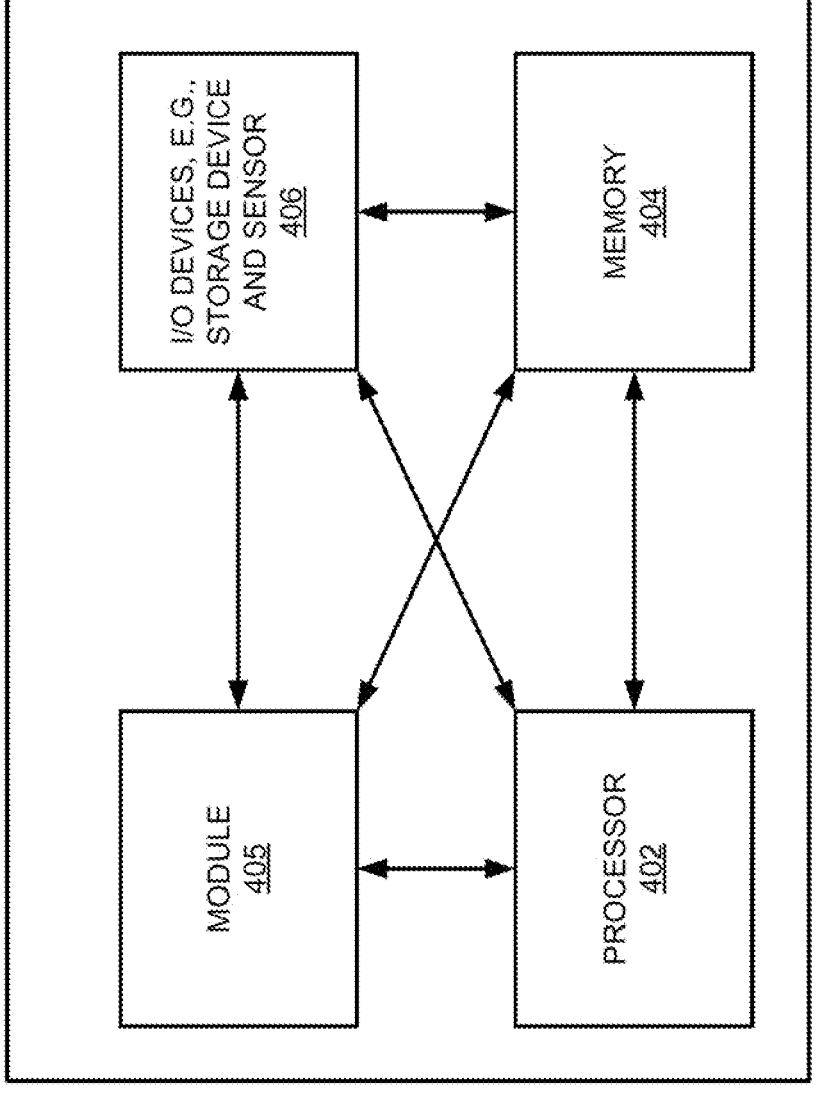
FIG. 4 depicts a high-level block diagram of a computing device specifically programmed to perform the functions described herein.

FIG. 4 depicts a high-level block diagram of a computing device specifically programmed to perform the functions described herein. For example, any one or more components or devices illustrated in FIG. 1 or described in connection with the method 200 or method 300 may be implemented as the system 400. For instance, an application server, satellite, or other network element of a non-terrestrial network (such as might be used to perform the method 200) or (or a mobile device (such as might be used to perform the method 300) could be implemented as illustrated in FIG. 4.

As depicted in FIG. 4, the system 400 comprises a hardware processor element 402, a memory 404, a module 405 for optimizing the power consumption of user endpoints connected to non-terrestrial networks, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for optimizing the power consumption of user endpoints connected to non-terrestrial networks may include circuitry and/or logic for performing special purpose functions relating to monitoring the movements of satellites in a non-terrestrial network. The input/output devices 406 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for optimizing the power consumption of user endpoints connected to non-terrestrial networks (e.g., a software program comprising computer-executable instructions) can be loaded into memory 404 and executed by hardware processor element 402 to implement the steps, functions or operations as discussed above in connection with the example method 200 or example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for optimizing the power consumption of user endpoints connected to non-terrestrial networks (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:

detecting, by a processing system including at least one processor, that a first satellite of a non-terrestrial network is moving out of a field of view of a user endpoint device that is currently connected to the non-terrestrial network, wherein the detecting comprises estimating a time at which the first satellite is expected to leave the field of view of the user endpoint device;

estimating, by the processing system, a time at which a second satellite of the non-terrestrial network is expected to enter the field of view of the user endpoint device;

selecting, by the processing system in response to the time at which the second satellite of the non-terrestrial network is expected to enter the field of view of the user endpoint device, an uplink power for the user endpoint device, wherein the uplink power is selected to be equal to an uplink power at which the user endpoint device is currently transmitting when the time at which the second satellite of the non-terrestrial network is expected to enter the field of view of the user endpoint device is within a predefined threshold period of time of the time at which the first satellite is expected to leave the field of view of the user endpoint device; and sending, by the processing system to the user endpoint device, an instruction to transmit at the uplink power that is selected.

2. The method of claim 1, wherein the processing system is part of a network element of the non-terrestrial network.

3. The method of claim 2, wherein the processing system is part of the first satellite.

4. The method of claim 2, wherein the processing system is part of an application server that monitors locations and movements of satellites within the non-terrestrial network, including the first satellite.

5. The method of claim 1, wherein the first satellite is a low earth orbit satellite.

6. The method of claim 1, wherein the time at which the first satellite is expected to leave the field of view of the user endpoint device is estimated based on at least one of: a current location of the user endpoint device, a current trajectory of the user endpoint device, a current speed of motion of the user endpoint device, a current location of the first satellite, a current trajectory of the first satellite, or a current speed of motion of the first satellite.

7. The method of claim 6, wherein the processing system utilizes a machine learning algorithm that is trained to take as an input the at least one of: the current location of the user endpoint device, the current trajectory of the user endpoint device, the current speed of motion of the user endpoint device, the current location of the first satellite, the current trajectory of the first satellite, or the current speed of motion of the first satellite and to generate as an output the time at which the first satellite is expected to leave the field of view of the user endpoint device.

8. The method of claim 1, wherein the predefined threshold period of time is configurable.

9. The method of claim 8, wherein the predefined threshold period of time is configured to minimize wastage of the uplink power.

10. The method of claim 8, wherein the predefined threshold period of time is configured to maximize an opportunity for the user endpoint device to maintain a connection to the non-terrestrial network.

11. The method of claim 1, wherein the time at which the second satellite of the non-terrestrial network is expected to enter the field of view of the user endpoint device is estimated based on at least one of: a current location of the user endpoint device, a current trajectory of the user endpoint device, a current speed of motion of the user endpoint device, a current location of the second satellite, a current trajectory of the second satellite, or a current speed of motion of the second satellite.

12. The method of claim 11, wherein the processing system utilizes a machine learning algorithm that is trained to take as an input the at least one of: the current location of the user endpoint device, the current trajectory of the user endpoint device, the current speed of motion of the user endpoint device, the current location of the second satellite, the current trajectory of the second satellite, or the current speed of motion of the second satellite and generates as an output the time at which the second satellite of the non-terrestrial network is expected to enter the field of view of the user endpoint device.

13. The method of claim 1, wherein the user endpoint device comprises at least one of: a laptop computer, a wi-fi device, a personal digital assistant, a mobile phone, a smartphone, an email device, a computing tablet, a messaging device, a wearable smart device, a gaming console, a drone, or an autonomous vehicle.

14. A non-transitory computer-readable medium storing instructions which, when executed by a processing system including at least one processor, cause the processing system to perform operations, the operations comprising:
   detecting that a first satellite of a non-terrestrial network is moving out of a field of view of a user endpoint device that is currently connected to the non-terrestrial network, wherein the detecting comprises estimating a time at which the first satellite is expected to leave the field of view of the user endpoint device;
   estimating a time at which a second satellite of the non-terrestrial network is expected to enter the field of view of the user endpoint device;
   selecting, in response to the time at which the second satellite of the non-terrestrial network is expected to enter the field of view of the user endpoint device, an uplink power for the user endpoint device, wherein the uplink power is selected to be equal to an uplink power at which the user endpoint device is currently transmitting when the time at which the second satellite of the non-terrestrial network is expected to enter the field of view of the user endpoint device is within a predefined threshold period of time of the time at which the first satellite is expected to leave the field of view of the user endpoint device; and
   sending, to the user endpoint device, an instruction to transmit at the uplink power that is selected.

15. The non-transitory computer-readable medium of claim 14, wherein the predefined threshold period of time is configurable.

16. The non-transitory computer-readable medium of claim 15, wherein the predefined threshold period of time is configured to minimize wastage of the uplink power.

17. The non-transitory computer-readable medium of claim 15, wherein the predefined threshold period of time is configured to maximize an opportunity for the user endpoint device to maintain a connection to the non-terrestrial network.

18. A device comprising:
   a processing system including at least one processor; and
   a computer-readable medium storing instructions which, when executed by the processing system, cause the processing system to perform operations, the operations comprising:
      detecting that a first satellite of a non-terrestrial network is moving out of a field of view of a user endpoint device that is currently connected to the non-terrestrial network, wherein the detecting comprises estimating a time at which the first satellite is expected to leave the field of view of the user endpoint device;
      estimating a time at which a second satellite of the non-terrestrial network is expected to enter the field of view of the user endpoint device;
      selecting, in response to the time at which the second satellite of the non-terrestrial network is expected to enter the field of view of the user endpoint device, an uplink power for the user endpoint device, wherein the uplink power is selected to be equal to an uplink power at which the user endpoint device is currently transmitting when the time at which the second satellite of the non-terrestrial network is expected to enter the field of view of the user endpoint device is within a predefined threshold period of time of the time at which the first satellite is expected to leave the field of view of the user endpoint device; and
      sending, to the user endpoint device, an instruction to transmit at the uplink power that is selected.

19. The device of claim 18, wherein the predefined threshold period of time is configurable.

20. The device of claim 19, wherein the predefined threshold period of time is configured to perform at least one of: minimize wastage of the uplink power or maximize an opportunity for the user endpoint device to maintain a connection to the non-terrestrial network.

* * * * *